United States Patent [19]

McCrea

[11] Patent Number: 4,997,091
[45] Date of Patent: Mar. 5, 1991

[54] PACKAGE CONTAINING BIODEGRADABLE DUNNAGE MATERIAL

[76] Inventor: James S. McCrea, 1265 Pine Hill Dr., Annapolis, Md. 21401

[21] Appl. No.: 395,123

[22] Filed: Aug. 17, 1989

[51] Int. Cl.⁵ .............................................. B65D 81/12
[52] U.S. Cl. ........................................ 206/584; 162/4; 206/814; 410/117
[58] Field of Search ............... 206/521, 584, 583, 814; 162/4, 138; 410/117, 119

[56] References Cited

U.S. PATENT DOCUMENTS

| | | | |
|---|---|---|---|
| 2,579,036 | 12/1951 | Edelman | 206/584 X |
| 2,649,959 | 8/1953 | Rausch | 206/589 |
| 3,047,136 | 7/1962 | Graham | 206/584 |
| 3,074,543 | 1/1963 | Stanley | 206/584 |
| 3,304,219 | 2/1967 | Nickerson | 161/162 |
| 3,650,877 | 3/1972 | Johnson | 206/814 X |
| 3,655,500 | 4/1972 | Johnson | 161/104 |
| 4,123,989 | 10/1978 | Kelley | 162/4 |
| 4,157,696 | 6/1979 | Carlberg | 119/1 |
| 4,184,311 | 1/1980 | Rood | 53/434 |
| 4,440,575 | 4/1984 | Daussan et al. | 106/38.22 |
| 4,458,629 | 7/1984 | Gerber | 119/1 |
| 4,566,831 | 1/1986 | Groth | 410/117 |
| 4,806,410 | 2/1989 | Armington et al. | 162/138 X |

*Primary Examiner*—Bryon P. Gehman
*Attorney, Agent, or Firm*—Pollock, Vande Sande & Priddy

[57] ABSTRACT

Shock-absorbing biodegradable dunnage packaging material is obtained from recycling scrap paper by cooking the scrap paper in the presence of heated water to reduce the scrap paper to pulp fiber and then extruding the pulp fiber to thereby form the dunnage packaging material.

5 Claims, 1 Drawing Sheet

PACKAGE CONTAINING BIODEGRADABLE DUNNAGE MATERIAL

TECHNICAL FIELD

1. Description

The present invention is concerned with dunnage packaging material, and is especially concerned with free-flowing shock-absorbing dunnage packaging material that is also biodegradable and that is obtained from waste or scrap paper.

2. Background Art

Many different types of products that must be shipped or transported require careful packing in order to protect the product from damage during shipment. The problems are especially pronounced when fragile or delicate items such as glassware, art objects, delicate machinery, and precision instruments are involved. Various dunnage materials have been suggested for packing and protecting the products during shipment. However, these materials have not been entirely satisfactory for different reasons.

For instance, as discussed in U.S. Pat. No. 4,566,831 to Groth, it would be desirable and advantageous for a manufacturer to dispose of waste products such as paper products, wood products and fabrics by using such for dunnage purposes. However, direct use of such waste materials for dunnage purposes has generally proved to be impractical. In particular, paper waste products in, for example, shredded or crumpled form, have been generally unacceptable particularly on large scale use since such is impractical to shovel or blow into the desired packaging container during loading. Moreover, shredded or crumpled paper does not provide sufficiently high shock absorbent properties needed unless such is very tightly packed.

Loose materials such as excelsior or macerated paper have been used for protecting articles in packaging containers. Although such has been reported to be reasonably effective as an energy absorbent packaging material, use of such loose material is somewhat messy when the article is to be unpackaged. Also, such loose packaging material is unsuitable for precision types of articles that can be damaged by the presence of foreign particles or excessive dust. Along these lines, U.S. Pat. No. 3,304,219 to Nickerson mentions that macerated paper is sometimes packaged itself (see Column 1, Lines 34-36 thereof). However, such is not entirely satisfactory since the packaging pads are often punctured thereby resulting in the macerated papers fibers still causing a problem in the unpackaging.

Over the last several years, the use of lightweight plastic materials such as polystyrene foams in various shapes such as those resembling peanuts have been widely used for packaging. Although these materials have been quite successful from a commercial standpoint, such are not entirely satisfactory in view of the disposal problems with the material itself since the polymers employed are not biodegradable. Also, disposing of the materials can at times be somewhat of an annoyance in that they tend to be difficult to handle because of their relatively light weight, as well as, their propensity to accumulate static electricity.

Also of interest in the literature for such purposes is U.S. Pat. No. 3,655,500 to Johnson which suggests a paper "pad" for cushioning by taking a two-ply sheet of paper, rolling in the two opposing sides, crushing the scroll-shaped roll and sealing the two rolled ends together.

U.S. Pat. Nos. 3,047,136 to Grahm and 3,074,543 to Stanley are also of interest concerning this subject matter since such suggests flexible or collapsible material for packaging that employ cut drinking straws.

SUMMARY OF INVENTION

In accordance with the present invention, a dunnage packaging material is provided which is relatively inexpensive, easy to use and readily disposable. In particular, the dunnage material employed in the present invention is biodegradable, relatively inexpensive since it is processed from waste material and can be used in the same packaging processes and equipment as currently used for the synthetic polymer peanut-like dunnage materials.

In particular, it has been found according to the present invention that free-flowing biodegradable dunnage packaging material can be obtained from recycled scrap paper. The scrap paper is cooked in the presence of heated water at a temperature and for a time sufficient to reduce the scrap paper to pulp fiber and then the pulp fiber is extruded to thereby form the dunnage packaging material of desired size and shape. This material is then employed in a haphazard relationship and closely packed relationship around an article in an outer container to hold the article in spaced relationship to the sides of the outer container.

BEST AND VARIOUS MODES FOR CARRYING OUT INVENTION

It has been found pursuant to the present invention that a loose mass of relatively small pellet-like particles obtained from scrap paper possess the necessary qualities of flowability, resilience and crushability and relative density that such can be used as a packaging material and can be used in the same types of processes and equipment that the polymeric peanut-like materials are now employed. Moreover, the particular types of products employed pursuant to the present invention are readily flowable so that such can be poured into recesses and openings of oddly-shaped items and within the confines of shipping packages in such a manner so as to completely isolate the packaged item from the sides of the container.

The products employed pursuant to the present invention flow freely; and therefore, can be fed by gravity, for instance, from overhead storage hoppers into shipping containers which are being packed with various sized goods. The pellet-like particles employed pursuant to the present invention flow over and around the products in the shipping container flowing between the products and filling the voids. With the voids being filled, the products are prevented from shifting and being damaged.

Figure 1:
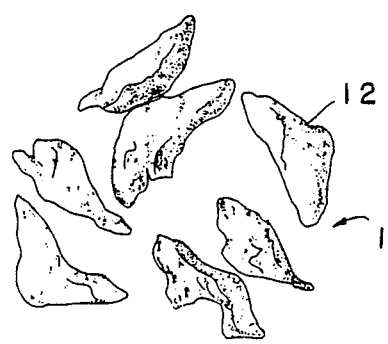
FIG. 1 is a schematic diagram of dunnage material of the present invention.

Reference to FIG. 1 illustrates dunnage material of the present invention presented in particular shapes, with it being understood that the material can be processed to produce any desired shape. The material of the present invention is obtained from scrap paper such as scrap newspaper. In particular, the scrap paper is cooked in the presence of heated water in order to reduce it to pulp fiber. The time and temperature of the treatment will vary depending upon the particular source of material, quantity, relative amount of water In a preferred processing technique, boiling water is employed as the medium to reduce the scrap paper and usually times from about 30 seconds to about 5 minutes are sufficient. The pulp fiber thereby obtained is then extruded to provide the desired shape and remove at least part of the water. The shaped product can then be dried, for instance, heating in a convection oven at temperatures of about 250° to about 350° F. for about ¼ to about 2 hours.

Various techniques for converting waste paper products into forms for other uses are well-known and need not be described herein in any great detail. For instance, see U.S. Pat. No. 4,123,489 to Kelley, as well as, U.S. Pat. Nos. 4,157,696 to Carlberg and 4,440,575 to Daussan, et al. Once persons skilled in the art are aware of the present disclosure, the particular method of obtaining the desired recycled product can be achieved without undue experimentation. The recycled products suggested in the prior art are suggested for use as lightweight aggregates, mulches, animal feeds, and insulation. However, the ability to use recycled pellet-type products as in the present invention for dunnage was not at all apparent from the prior suggestions of using converted waste products.

Typical size products of the present invention are about one-half (½) inch to about two (2) inches long and about one-quarter (¼) inch to about three-quarters (¾) inch in diameter.

Figure 2:
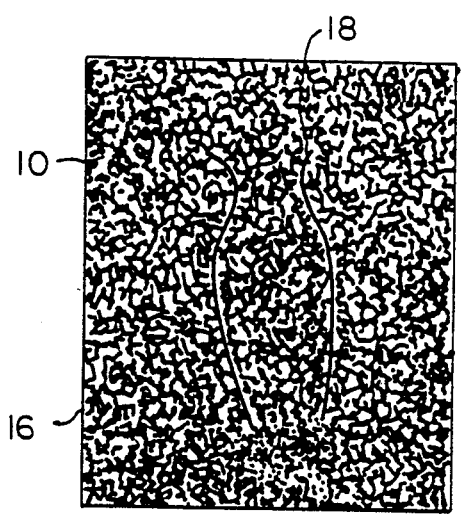
FIG. 2 is a view in perspective illustrating a packing operation in accordance with the present invention.

FIG. 2 illustrates a typical packing operation that can employ the materials (2) of the present invention being poured into a container (4) of the packaging material into a shipping container (6). As illustrated, the packaging material is poured all around and within the hollow opening of a fragile vase (8) being packaged within the container (6). This quality of pourability of the dunnage material of the present invention makes it readily adaptable to high speed machine-type packaging operation such as might be used on a production line in the packaging of the large quantity of identical items. It is of equal value in permitting a rapid efficient packaging of shipping containers by hand, particularly as no special skills are required in the performance of the packaging operation.

Figure 3:
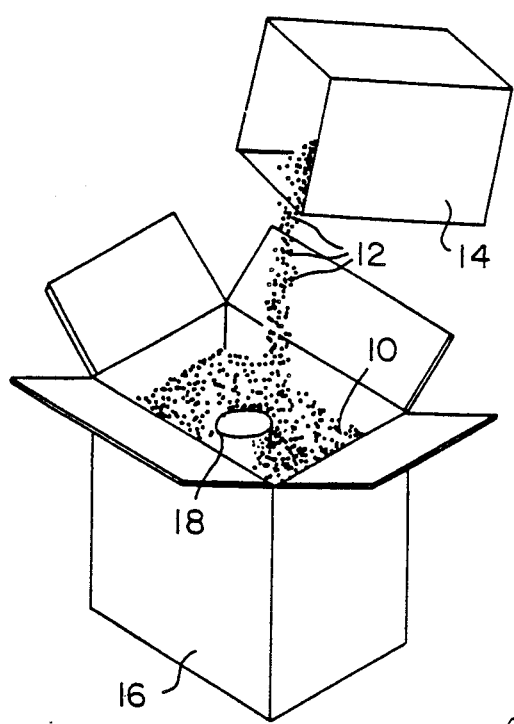
FIG. 3 is a view of vertical section showing use of the packaging material of the present invention in a carton that has been sealed for shipment or storage.
Figure 4:
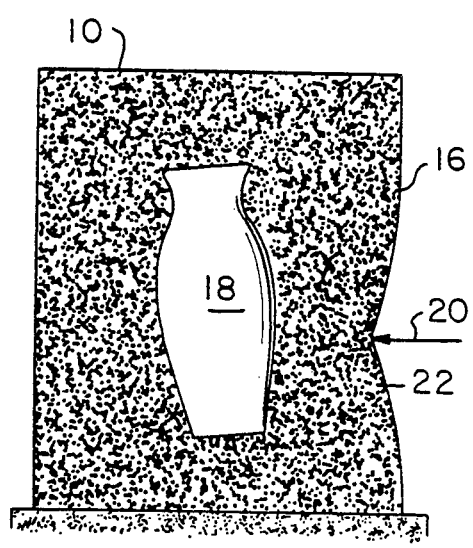
FIG. 4 is a vertical section showing the manner in which a sharp blow or shock is absorbed by the packaging material.

FIG. 3 illustrates a sealed shipping container (6) completely filled with a loose mass (10) of the packaging dunnage material employed pursuant to the present invention. It will be noted that no additional wrapping or packing material other than the recycled biodegradable dunnage has been employed. A packed unit of this type containing the stiff outer walls of the container confining the loose interior packing dunnage has been found to completely isolate a packed item from all but the severest external blows. This is because the force or shock of impacts, for example, as shown in FIG. 4 is virtually absorbed by the mass of packing material.

Figure 5:
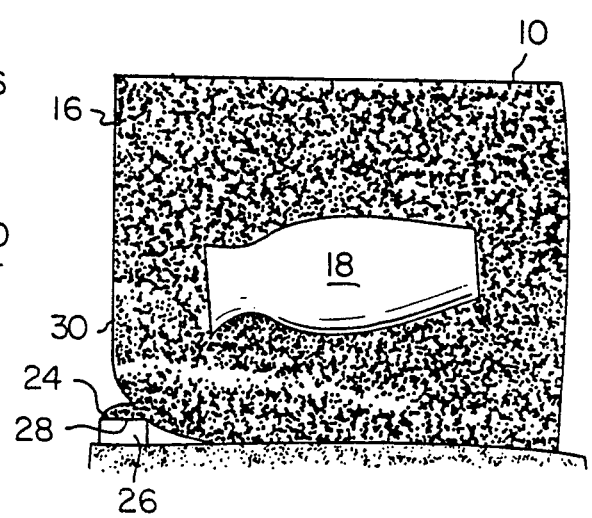
FIG. 5 is a vertical section showing the manner in which the packing material protects the packaged item from breakage.

FIG. 5 further illustrates the protective effect of the packing material in an instance in which the shipping carton falls or is tipped.

The present invention makes possible a rapid efficient packing of a wide variety of oddly-shaped items such as glassware, instruments, china, and delicate machinery by a simple procedure involving only the pouring of the packing mass into and about the item to be shipped. Furthermore, the procedures needed to carry out the present invention require no knowledge or skill in particular packing techniques and can be readily carried out by hand or by machinery. The biodegradable dunnage employed pursuant to the present invention can be used in the shipping or storage of delicate and precision electronic or mechanical equipment or instruments, optical equipment, light bulbs, items of foods such as eggs and jars of fruit. Such may also be used in the shipment of explosives, chemicals or similar types of materials.

What is claimed is:

1. A package comprising an outer container having sides, at least one article within said outer container and free-flowing shock-absorbing biodegradable dunnage packaging material confined within said container wherein said packaging material is obtained by recycling scrap paper by cooking said scrap paper in the presence of heated water at a temperature and for a time sufficient to reduce the scrap paper to pulp fiber and then extruding the pulp fiber under pressure to thereby form said shock-absorbing biodegradable dunnage packaging material into pellet-like particles having desired size and shape, and wherein said shock-absorbing biodegradable dunnage packaging material is arranged in a haphazard relationship and closely packed around the article and holding the article in spaced relationship to the sides of the container.

2. The package of claim 1 wherein said scrap paper is scrap newspaper.

3. The package of claim 1 wherein said dunnage packaging material is about one-half (½) inch to about two (2) inches long and about one-quarter (¼) inch to about three-quarters (¾) inch in diameter.

4. The package of claim 1 wherein said cooking is carried out in boiling water.

5. The package of claim 1 wherein said pellet-like particles are crushable.

* * * * *